United States Patent
Okazaki

(10) Patent No.: US 11,080,063 B2
(45) Date of Patent: Aug. 3, 2021

(54) PROCESSING DEVICE AND METHOD OF CONTROLLING PROCESSING DEVICE

(71) Applicant: FUJITSU LIMITED, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/665,449

(22) Filed: Oct. 28, 2019

(65) Prior Publication Data

US 2020/0150965 A1    May 14, 2020

(30) Foreign Application Priority Data

Nov. 9, 2018    (JP) .............................. JP2018-211577

(51) Int. Cl.
| | |
|---|---|
| *G06F 9/22* | (2006.01) |
| *G06F 9/30* | (2018.01) |
| *G06F 9/38* | (2018.01) |
| *G06F 9/32* | (2018.01) |

(52) U.S. Cl.
CPC ............ *G06F 9/381* (2013.01); *G06F 9/3016* (2013.01); *G06F 9/30196* (2013.01); *G06F 9/3804* (2013.01); *G06F 9/3836* (2013.01); *G06F 9/325* (2013.01); *G06F 9/3814* (2013.01); *G06F 9/3844* (2013.01); *G06F 9/3853* (2013.01)

(58) Field of Classification Search
CPC .... G06F 9/381; G06F 9/3016; G06F 9/30196; G06F 9/3804; G06F 9/3836; G06F 9/382; G06F 9/3853; G06F 9/3808; G06F 9/3814; G06F 9/30058; G06F 9/30065; G06F 9/3832; G06F 9/3842; G06F 9/3844; G06F 9/3846; G06F 9/3848; G06F 9/325
USPC ......................................... 712/239–241, 213
See application file for complete search history.

(56) References Cited

U.S. PATENT DOCUMENTS

| | | | | |
|---|---|---|---|---|
| 4,338,661 | A | * | 7/1982 | Tredennick ............. G06F 9/262 |
| | | | | 712/234 |
| 5,617,549 | A | * | 4/1997 | DeLano ................. G06F 9/3802 |
| | | | | 712/206 |

(Continued)

FOREIGN PATENT DOCUMENTS

| | | |
|---|---|---|
| JP | 10-105399 A | 4/1998 |
| JP | 2006-309337 A | 11/2006 |

(Continued)

*Primary Examiner* — Daniel H Pan
(74) *Attorney, Agent, or Firm* — Fujitsu Patent Center

(57) ABSTRACT

A processing device includes an instruction extractor that extracts target instructions intended for a loop process that is repeatedly performed, from instructions decoded by an instruction decoder, and a loop buffer including entries where each of the target instructions extracted by an instruction extractor are stored. An instruction processor stores a target instruction into one of the entries of the loop buffer, and combines target instructions into one target instruction in a case where resources of an instruction execution circuit used by the target instructions do not overlap, to store the one instruction in one of the entries of the loop buffer, and a selector selects the instruction output from the instruction decoder or the target instruction output from the loop buffer, and outputs the selected instruction to the instruction execution circuit.

13 Claims, 9 Drawing Sheets

(56) References Cited

U.S. PATENT DOCUMENTS

| | | | |
|---|---|---|---|
| 6,330,657 B1 * | 12/2001 | Col | G06F 9/3017 |
| | | | 712/23 |
| 2006/0242394 A1 | 10/2006 | Uchiyama | |
| 2010/0082953 A1 * | 4/2010 | Chiu | G06F 9/3844 |
| | | | 712/239 |
| 2016/0092230 A1 * | 3/2016 | Chen | G06F 9/30065 |
| | | | 712/241 |
| 2018/0004528 A1 | 1/2018 | Okazaki et al. | |

FOREIGN PATENT DOCUMENTS

| | | |
|---|---|---|
| JP | 2015-219823 A | 12/2015 |
| JP | 2018-5488 A | 1/2018 |

* cited by examiner

FIG.5

```
1    LOOP    ADD X3, X4, X5
2            MOVa X0, #A
3            MOVb X0, #B, LSL16
4              :
5              :
6              :
7            CMP X0, X1
8            BNE LOOP
9              :
```

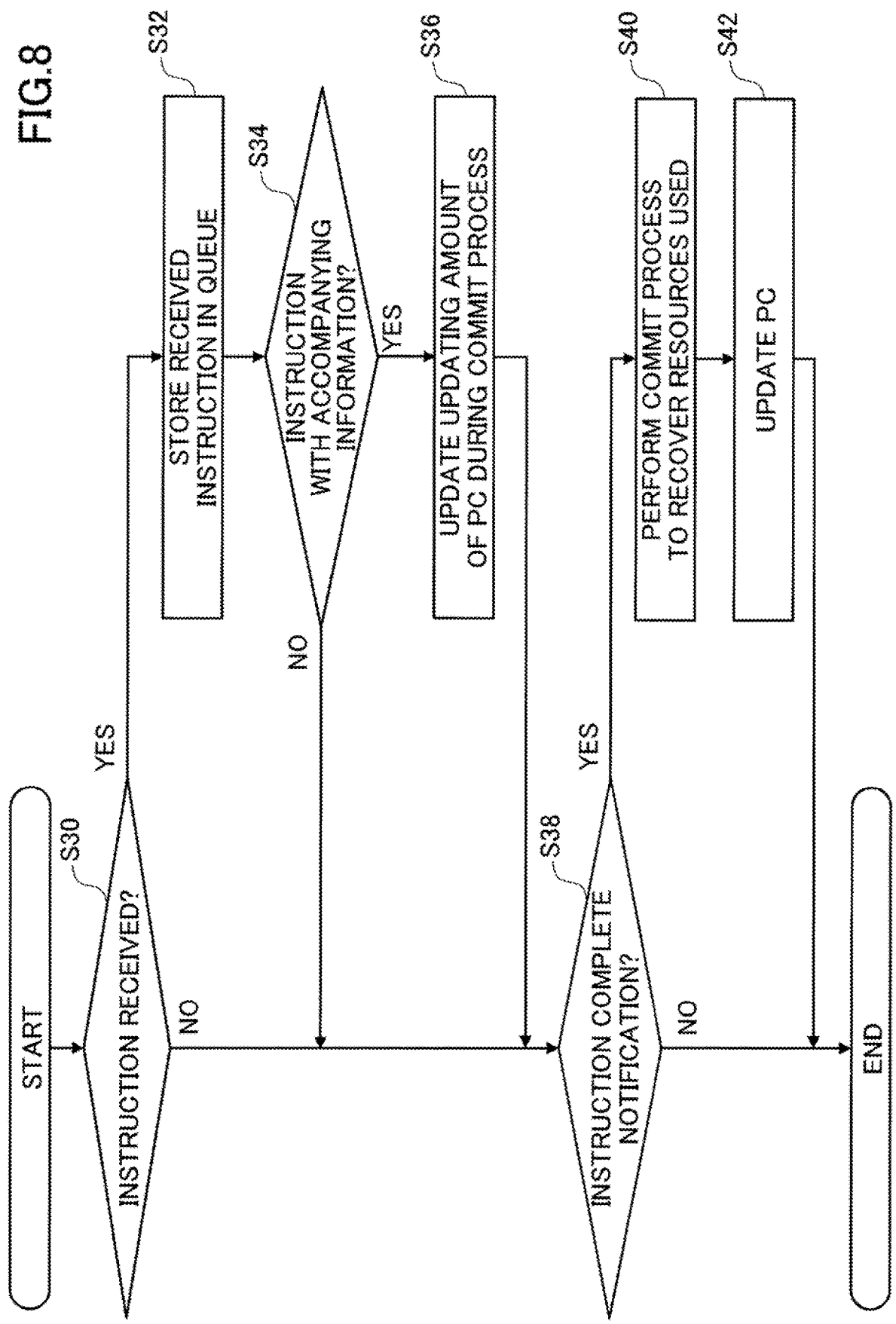

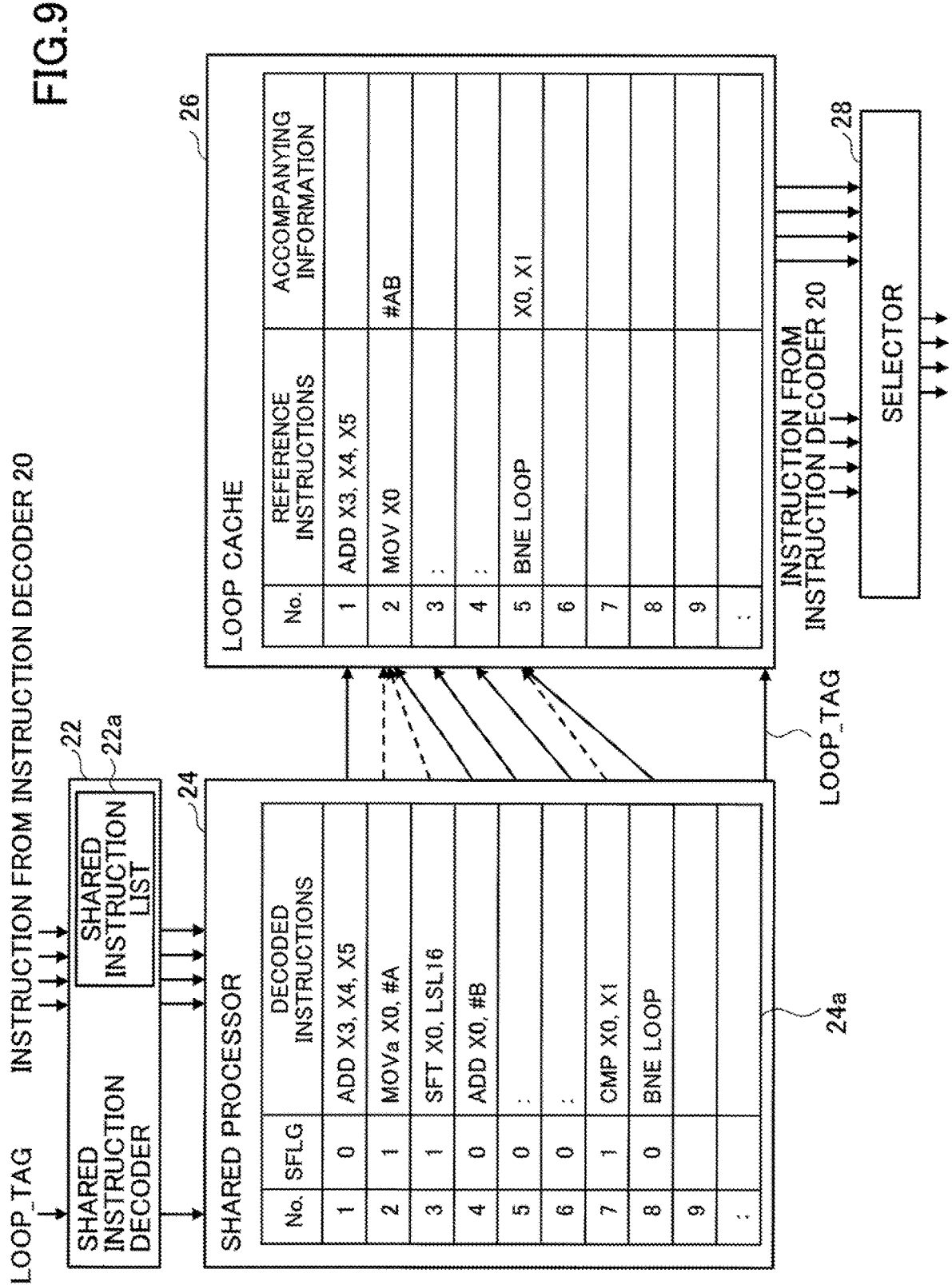

PROCESSING DEVICE AND METHOD OF CONTROLLING PROCESSING DEVICE

CROSS-REFERENCE TO RELATED APPLICATIONS

This application is based upon and claims the benefit of priority of the prior Japanese Patent Application No. 2018-211577, filed on Nov. 9, 2018, the entire contents of which are incorporated herein by reference.

FIELD

The embodiments discussed herein are related to a processing device, and a method of controlling the processing device.

The processing device is sometimes also referred to as a processor, an arithmetic processing unit, or the like.

BACKGROUND

Processing devices proposed in Japanese Laid-Open Patent Publications No. 2015-219823 and No. 2006-309337, for example, store a loop instruction for executing an instruction loop process, and a branch instruction, together with an instruction at a branch destination, in a loop buffer. When branch by the branch instruction is made (taken), these processing devices read the instruction from the loop buffer, and execute the read instruction. In addition, a processing device proposed in Japanese Laid-Open Patent Publication No. 2018-005488, for example, stops operations of a branch predictor, an instruction buffer, an instruction decoder, or the like when executing the instruction output from the loop buffer. A processing device proposed in Japanese Laid-Open Patent Publication No. H10-105399, for example, causes a pipeline to perform the same operation as in a case where a plurality of instructions are executed, by converting a control signal output to the pipeline when the plurality of instructions within the instruction buffer are simultaneously executable by the pipeline.

The number of instructions storable in the loop buffer is less than or equal to the number of entries of the loop buffer. For this reason, when the number of instructions to the branch instruction, from the instruction at the branch destination to where the branch is made (taken) based on the branch instruction, exceeds the number of entries of the loop buffer, the loop buffer cannot be used. In addition, when the number of entries of the loop buffer is increased to increase the number of instructions storable in the loop buffer, both the scale of the loop buffer and the scale of a circuit that controls the loop buffer become large, to increase the chip size of the processing device.

SUMMARY

Accordingly, it is an object in one aspect of the embodiments to provide a processing device, and a method of controlling the processing device, which can increase the number of instructions substantially storable in a loop buffer, to improve throughput of execution of instructions by an instruction execution circuit.

According to one aspect of the embodiments, a processing device includes an instruction decoder configured to decode instructions; an instruction execution circuit configured to execute the instructions decoded by the instruction decoder; an instruction extractor configured to extract target instructions intended for a loop process that is repeatedly performed, from the instructions decoded by the instruction decoder; a loop buffer including a plurality of entries where each of the target instructions extracted by the instruction extractor are stored; an instruction processor configured to store a target instruction into one of the plurality of entries of the loop buffer, and combine a plurality of target instructions into one target instruction in a case where resources of the instruction execution circuit used by the plurality of target instructions do not overlap, to store the one target instruction in one of the plurality of entries of the loop buffer; and a selector configured to select the instruction output from the instruction decoder or the target instruction intended output from the loop buffer, and output the selected instruction to the instruction execution circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a program executed by the processing device illustrated in FIG. 4;

FIG. 8 is a diagram illustrating an example of an operation of a commit controller illustrated in FIG. 4; and FIG. 9 is a diagram illustrating an example of information stored in the shared processor and the loop cache of the processing device according to a third embodiment.

DESCRIPTION OF EMBODIMENTS

Preferred embodiments of the present invention will be described with reference to the accompanying drawings.

A description will be given of a processing device, and a method of controlling the processing device, according to each embodiment.

Figure 1:
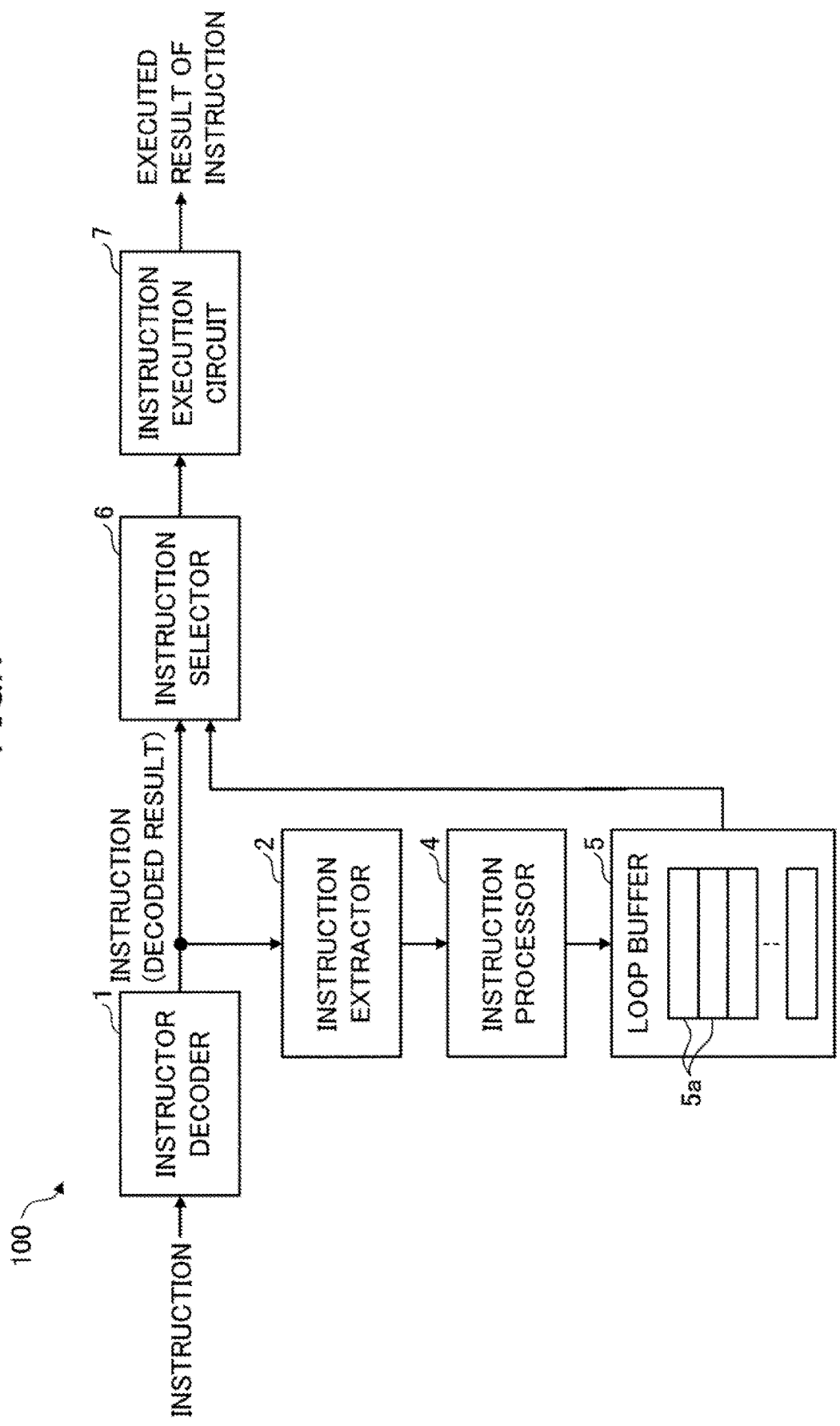
FIG. 1 is a diagram illustrating an example of a processing device according to a first embodiment.

FIG. 1 is a diagram illustrating an example of the processing device according to a first embodiment. The processing device is sometimes also referred to as a processor, an arithmetic processing unit, or the like. A processing device 100 illustrated in FIG. 1 includes an instruction decoder (or instruction decoding unit) 1, an instruction extractor (or instruction extraction unit) 2, an instruction processor (or instruction processing unit) 4, a loop buffer (or loop buffer unit) 5, an instruction selector (or instruction selection unit) 6, and an instruction execution circuit 7. The processing device 100 may be a superscalar processor that fetches a plurality of instructions in parallel and executes the plurality of fetched instructions in parallel, a scalar processor, or the like.

The instruction decoder 1 decodes instructions fetched from a memory (not illustrated), such as a primary instruction cache or the like, and outputs decoded instructions (or decoded results). The instruction extractor 2 extracts, from the instructions decoded by the instruction decoder 1, target instructions intended for a loop process that is repeatedly executed. For example, the target instruction intended for the loop process may be predicted by a branch predictor (not illustrated) that predicts the address at a branch destination of a branch instruction. In this case, the instruction extractor 2 extracts the target instruction intended for the loop process according to the prediction of the branch predictor.

The instruction processor 4 stores the target instruction intended for the loop process and extracted by the instruction extractor 2, into one of a plurality of entries 5a of the loop buffer 5. However, in a case where a plurality of target instructions intended for the loop process and extracted by the instruction extractor 2 are executable as one instruction, the instruction processor 4 may combine (or integrate) the plurality of target instructions intended for the loop process into one target instruction intended for the loop process, and store one target instruction intended for the loop process into one of the plurality of entries 5a of the loop buffer 5. For example, the plurality of combinable target instructions intended for the loop process include a compare instruction that sets a condition code in a condition code register according to a comparison result, and a conditional branch instruction following the compare instruction. The combinable target instructions intended for the loop process are not limited to the compare instruction and the conditional branch instruction. In a case where one target instruction intended for the loop process, obtained by combining the plurality of target instructions intended for the loop process, is executable without causing conflict of resources within the instruction execution circuit 7, for example, the plurality of target instructions intended for the loop process are combinable.

The loop buffer 5 includes the plurality of entries 5a where the target instructions intended for the loop process and extracted by the instruction extractor 2, or the target instructions intended for the loop process and combined by the instruction extractor 2, are stored. Upon completion of the storage of the target instructions intended for the loop process into the entries 5a of the loop buffer 5, the loop buffer 5 successively outputs the target instructions intended for the loop process and stored in the entries 5a to the instruction selector 6 until the execution of the loop process is canceled. In a case where a branch condition of the conditional branch instruction is satisfied and the loop process is repeated, for example, the execution of the loop process is canceled when the branch condition is no longer satisfied.

The instruction selector 6 selects one of the instruction output from the instruction decoder 1, and the target instruction intended for the loop process and output from the loop buffer 5, and outputs the selected instruction to the instruction execution circuit 7. In a case where the storage of the target instruction intended for the loop process to the loop buffer 5 is not completed, the instruction selector 6 selects the instruction output from the instruction decoder 1. In a case where the storage of the target instruction intended for the loop process to the loop buffer 5 is completed, the instruction selector 6 selects the target instruction intended for the loop process and output from the loop buffer 5. For example, whether the storage of the target instruction intended for the loop process to the loop buffer 5 is completed, may be notified from the loop buffer 5 to the instruction selector 6, or from the instruction processor 4 to the instruction selector 6.

The instruction execution circuit 7 executes the instruction from the instruction decoder 1 or the instruction from the loop buffer 5, received via the instruction selector 6, and outputs an execution result of the instruction. For example, the instruction execution circuit 7 includes a computing unit that executes an operation instruction, a judging unit that judges the branch destination of the branch instruction, or the like.

Figure 2:
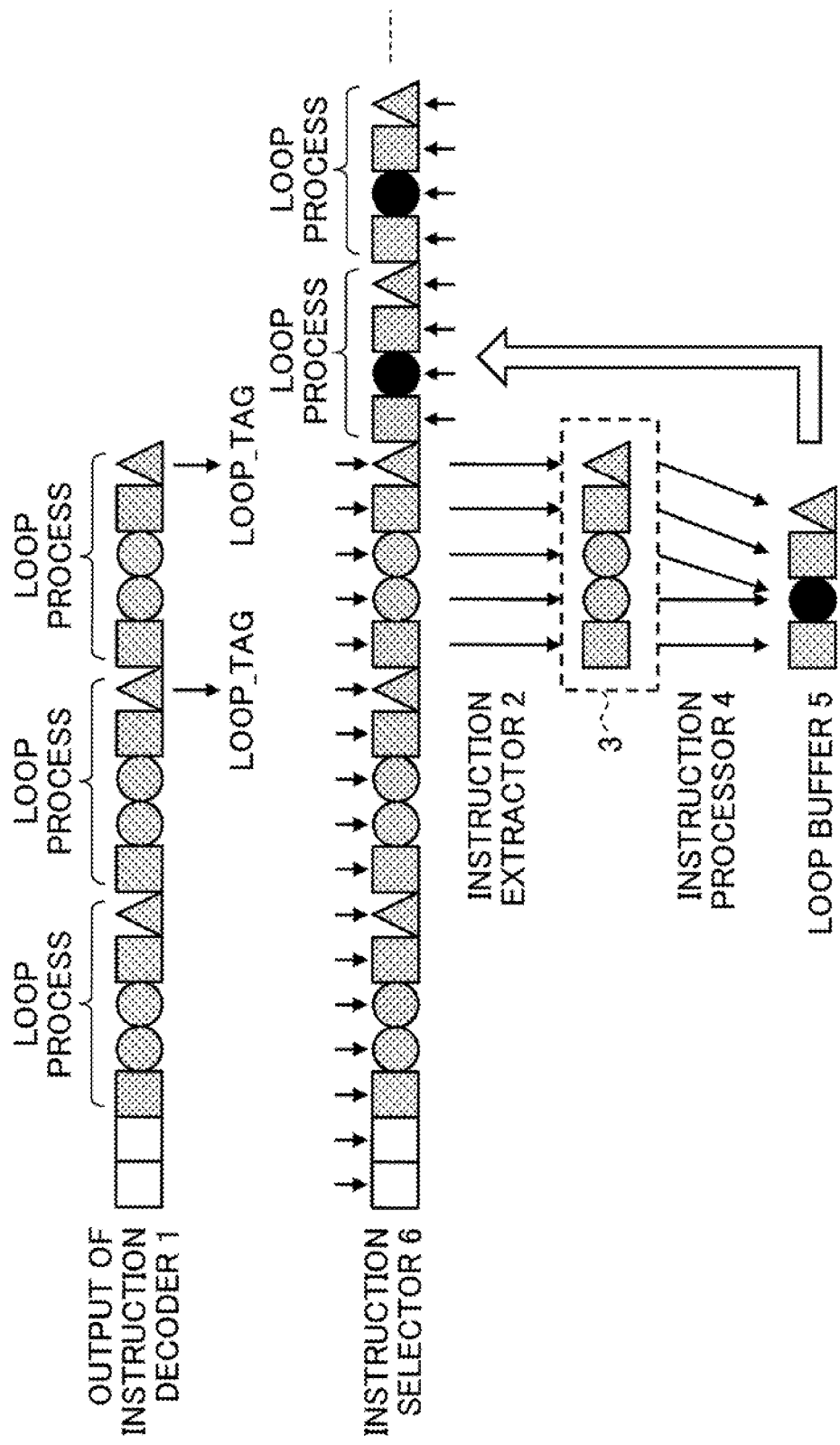
FIG. 2 is a diagram illustrating an example of an operation of the processing device illustrated in FIG. 1.

FIG. 2 is a diagram illustrating an example of an operation of the processing device 100 illustrated in FIG. 1. In other words, FIG. 2 illustrates an example of a method of controlling the processing device 100. In FIG. 2, a transposed rectangular mark "□" indicates a normal instruction other than the target instruction intended for the loop process, and a rectangular mark "□" with halftone dot meshing, a circular mark "○" with halftone dot meshing, and a triangular mark "Δ" with halftone dot meshing respectively indicate the target instructions intended for the loop process. Two adjacent circular marks "○" with the halftone dot meshing indicate the target instructions intended for the loop process that are combinable into one target instruction intended for the loop process. The triangular mark "Δ" with the halftone dot meshing indicates the conditional branch instruction which is one type of branch instruction. A black circular mark "●" indicates a combined target instruction intended for the loop process. Of course, the number of target instructions combinable into to one target instruction intended for the loop process may be three or more.

The conditional branch instruction indicated by the triangular mark "Δ" with the halftone dot meshing judges whether the branch condition is satisfied, based on a value of the condition code that is set according to the execution result of the immediately preceding instruction indicated by the rectangular mark "□" with the halftone dot meshing. For example, the conditional branch instruction indicated by the triangular mark "Δ" with the halftone dot meshing is an instruction to branch to a leading (or first) instruction of a group of target instructions intended for the loop process upon satisfying the branch condition. The conditional branch instruction may be an instruction to branch to the leading instruction of the group of target instructions intended for the loop process upon not satisfying the branch condition.

In FIG. 2, it is assumed for the sake of simplifying the description that the processing device 100 executes the fetched instructions in order. In the example illustrated in FIG. 2, the processing device 100, after fetching and executing the two instructions indicated by transposed rectangular mark "□", repeatedly executes the five target instructions intended for the loop process. For example, in a case where the branch predictor (not illustrated) or the like predicts that the loop process will continue, based on repeated fetching of instructions at a plurality of consecutive addresses, the branch predictor or the like outputs tag information LOOP_TAG two times according to a decode timing of the conditional branch instruction. The instruction selector 6 selects the instruction decoded by (that is, decoded result of) the instruction decoder 1, until the second tag information LOOP_TAG is output, and outputs the selected instruction to the instruction execution circuit 7. The instruction extractor 2 or other circuits may detect the continuation of the loop process.

The instruction extractor 2 extracts, as the target instructions intended for the loop process, the instructions received from a time when the first tag information LOOP_TAG is output until the next tag information LOOP_TAG is received. For example, the instruction extractor 2 may store the extracted target instructions intended for the loop process in an instruction holding unit 3. The instruction holding unit 3 may be provided inside the instruction extractor 2 or inside the instruction processor 4.

The instruction processor 4 stores the target instruction intended for the loop process and extracted by the instruction extractor 2 into one of the entries 5a of the loop buffer 5. However, in a case where resources of the instruction execution circuit 7 used by the plurality of consecutive target instructions intended for the loop process do not overlap, and the plurality of consecutive target instructions intended for the loop process are executable as one target instruction, the instruction processor 4 may combine the plurality of target instructions intended for the loop process into one target instruction intended for the loop process. In addition, the instruction processor 4 stores the combined, one target instruction intended for the loop process into one of the entries 5a of the loop buffer 5. By combining the plurality of target instructions intended for the loop process by the instruction processor 4 into one target instruction intended for the loop process, it is possible to increase the number of target instructions intended for the loop process, substantially storable in the entries 5a of the loop buffer 5. In other words, it is possible to improve the utilization efficiency of the entries 5a of the loop buffer 5.

The operations of the instruction extractor 2 and the instruction processor 4 are performed in parallel with the operation of the instruction execution circuit 7 on the target instructions intended for the loop process before storage to the loop buffer 5. In other words, the operations of the instruction extractor 2 and the instruction processor 4 are performed in a background of the operation of the instruction execution circuit 7 on the target instructions intended for the loop process before storage to the loop buffer 5. Hence, the instruction extractor 2 and the instruction processor 4 are provided in a path that is different from a path through which the normal instruction other than the target instructions intended for the loop process are transferred from the instruction decoder 1 to the instruction execution circuit 7. For this reason, deterioration of the processing performance of the processing device 100, caused by the operations of the instruction extractor 2 and the instruction processor 4, can be reduced.

In the case where the target instructions intended for the loop process are stored in the loop buffer 5, the loop buffer 5 repeatedly outputs the stored target instructions intended for the loop process. In the case where the target instructions intended for the loop process are output from the loop buffer, the instruction selector 6 inhibits selection of the instructions output from the instruction decoder 1, and selects the target instructions intended for the loop process and output from the loop buffer 5. A downwardly pointing arrow and an upwardly pointing arrow, related to the operation of the instruction selector 6 illustrated in FIG. 2, indicate the selection of the instructions from the instruction decoder 1 and the selection of the instructions from the loop buffer 5, respectively.

The instruction execution circuit 7 executes the instructions selected by the instruction selector 6. In this case, by executing the combined, one target instruction intended for the loop process, obtained by combining the target instructions intended for the loop process, a throughput of execution of the instructions by the instruction execution circuit 7 can be improved compared to a case where two target instructions intended for the loop process are successively executed. Because the target instruction intended for the loop process has a high possibility of being repeatedly executed, the contribution to the improvement of the throughput of execution of the instructions is high. In addition, in a case where the instructions are executed out of order, it is possible to improve the utilization efficiency of various resources that are used to change the execution order of the instructions. For example, it is possible to improve the utilization efficiency of entries of an update buffer that is used for the register renaming, and improve the utilization efficiency of the entries used for a commit process that performs a complete process of execution of the instruction. As a result, the throughput of execution of the instructions by the instruction execution circuit 7 can be improved.

Figure 3:
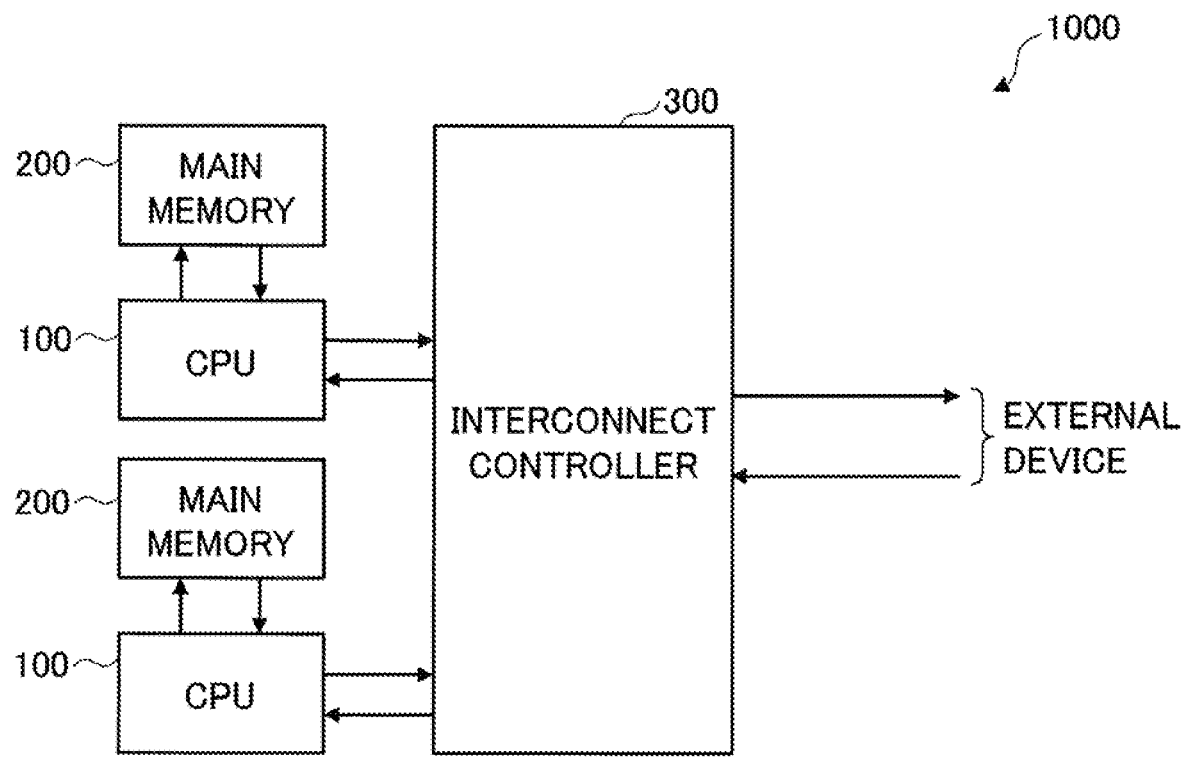
FIG. 3 is a diagram illustrating an example of an information processing system including the processing device illustrated in FIG. 1.

FIG. 3 is a diagram illustrating an example of an information processing system including the processing device 100 illustrated in FIG. 1. For example, the information processing system illustrated in FIG. 3 is a server 1000. The server 1000 includes a plurality of processing devices 100, a plurality of main memories 200, and an interconnect controller 300. For example, the processing devices 100 are Central Processing Units (CPUs), and are connected to the interconnect controller 300. Each main memory 200 is connected to the corresponding processing device 100. The interconnect controller 300 is connected to an external device, such as a Hard Disk Drive (HDD), a communication device, or the like, and performs an input and output control with respect to the external device.

According to the first embodiment illustrated in FIG. 1 through FIG. 3, it is possible to increase the number of target instructions intended for the loop process, substantially storable in the entries 5a of the loop buffer 5, and improve the utilization efficiency of the entries 5a of the loop buffer 5. For this reason, the throughput of execution of the target instructions intended for the loop process having the high possibility of being repeatedly executed, can be improved compared to a case where the target instructions intended for the loop process are not combined. Because the operations of the instruction extractor 2 and the instruction processor 4 are performed in the background of the operation of the instruction execution circuit 7 on the target instructions intended for the loop process, the deterioration of the processing performance of the processing device 100, caused by the operations of the instruction extractor 2 and the instruction processor 4, can be reduced. In the case where the instructions are executed out of order, it is possible to improve the utilization efficiency of the various resources that are used to change the execution order of the instructions. As a result, the throughput of execution of the instructions by the instruction execution circuit 7 can be improved, and the processing performance of the processing device 100 can be improved.

Figure 4:
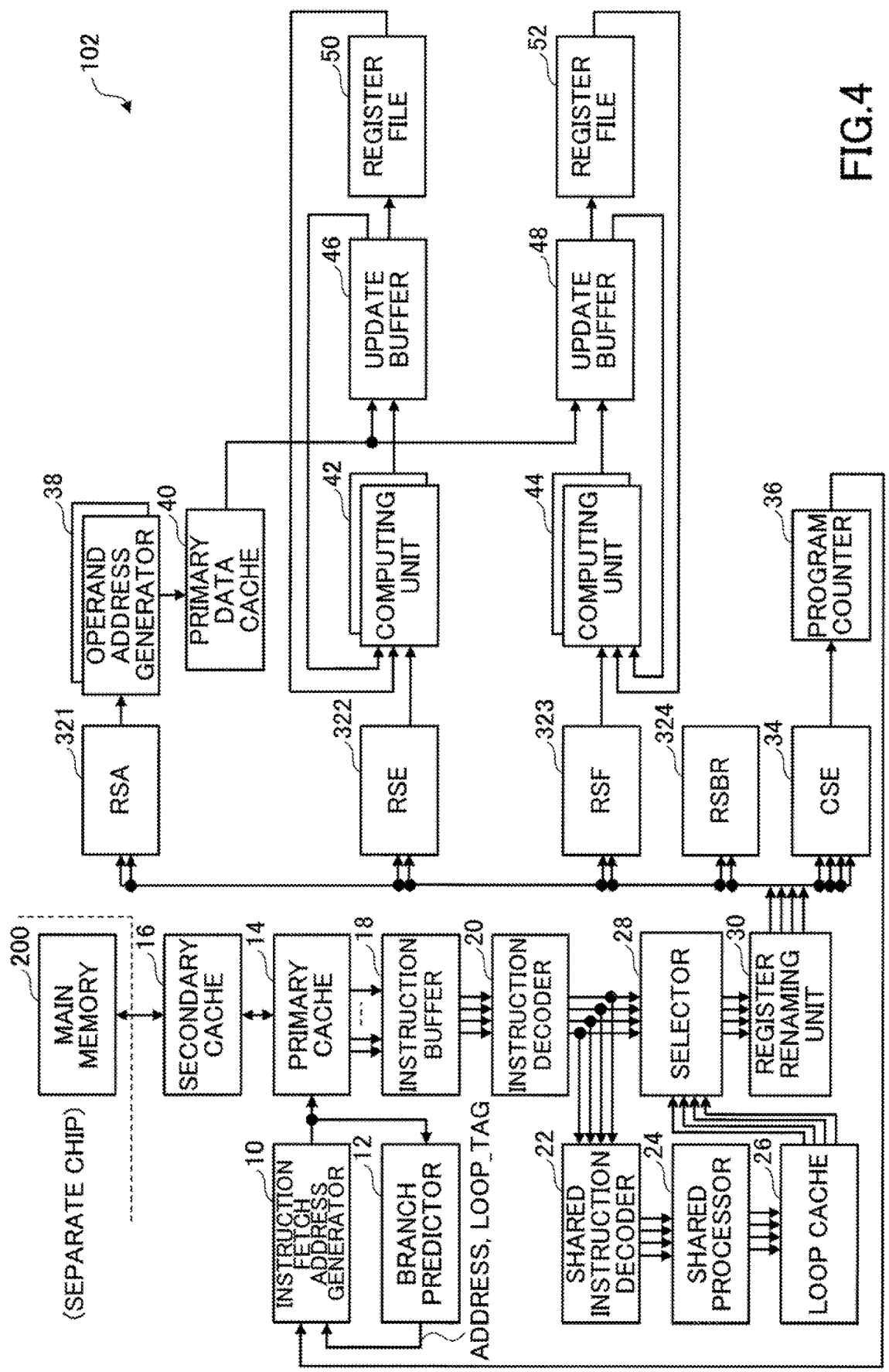
FIG. 4 is a diagram illustrating an example of the processing device according to a second embodiment.

FIG. 4 is a diagram illustrating an example of the processing device according to a second embodiment. In FIG. 4, those elements and functions that are the same as or similar to those corresponding elements and functions in FIG. 1 through FIG. 3 are designated by the same reference numerals, and a detailed description thereof may be omitted. A processing device 102 illustrated in FIG. 4 is a superscalar processor, for example. In addition, an information processing system that includes the processing device 102 has a structure similar to that illustrated in FIG. 3, and may be formed by replacing the reference numeral "100" of the CPUs in FIG. 3 by the reference numeral "102".

The processing device 102 includes an instruction fetch address generator 10, a branch predictor 12, a primary instruction cache 14, a secondary cache 16, an instruction buffer 18, an instruction decoder 20, a shared instruction decoder 22, a shared processor 24, and a loop cache 26. The processing device 102 also includes a selector 28, a register renaming unit 30, a reservation station 32 (321, 322, 323, and 324), a commit controller 34, and a program counter 36. The processing device 102 further includes operand address generators 38, a primary data cache 40, computing units 42 and 44, update buffers 46 and 48, and register files 50 and 52. The update buffer 46 and the register file 50 hold fixed-point number data, and the update buffer 48 and the register file 52 hold floating-point number data.

The instruction fetch address generator 10 is an example of an address generator that generates an address of an instruction to be fetched. The shared instruction decoder 22 is an example of the instruction extractor that extracts the target instruction intended for the loop process. The shared processor 24 is an example of the instruction processor that combines a plurality of target instructions intended for the loop process into one target instruction intended for the loop process. The loop cache 26 is an example of the loop buffer, and the selector 28 is an example of the instruction selector. The register renaming unit 30, the reservation station 32, the commit controller 34, the operand address generators 38, the computing units 42 and 44, the update buffers 46 and 48, and the register files 50 and 52 are an example of the instruction execution circuit.

In addition, the register renaming unit 30 is an example of a reservation controller that controls reservation of the update buffers 46 and 48. The update buffer 46 is an example of a buffer that includes an entry used in place of a register within the register file 50 during execution of the instruction. The commit controller 34 is an example of a complete controller that includes a plurality of entries to hold the instructions output from the instruction decoder 20 or the loop cache 26.

In a case where the address from the branch predictor 12 is not received, the instruction fetch address generator 10 generates the address that is used to fetch the instruction from the primary instruction cache 14, based on the address that is successively generated internally. In addition, in a case where the address from the branch predictor 12 is received, the instruction fetch address generator 10 generates the address that is used to fetch the instruction from the primary instruction cache 14, based on the address received from the branch predictor 12. In a case where a branch misprediction occurs or various errors occur, and an instruction pipeline is to be cleared to cancel execution of the instruction, the value of the program counter 36 is used to resume the instruction fetch.

The branch predictor 12 predicts whether a branch of the branch instruction will occur, based on the address generated by the instruction fetch address generator 10. In a case where the branch predictor 12 predicts that the branch will occur, the branch predictor 12 outputs a branch destination address to the instruction fetch address generator 10. For example, in a case where the branch predictor 12 predicts that the loop process in which a predetermined number of instructions is repeated will continue, the branch predictor 12 successively outputs the address intended for the loop process until the address intended for the loop process makes one round. In this case, the branch predictor 12 outputs the tag information LOOP_TAG together with a maximum value of the address intended for the loop process (storage address of the conditional branch instruction). Thereafter, the branch predictor 12 successively outputs the address intended for the branch destination, and again outputs the tag information LOOP_TAG together with the maximum value of the address intended for the branch destination. An example of a program including the target instruction intended for the loop process, will be described later in conjunction with FIG. 5.

The primary instruction cache 14 obtains the instruction held in a region indicated by the address that is received from the instruction fetch address generator 10, and outputs the obtained instruction to the instruction buffer 18. The tag information LOOP_TAG is output to the instruction buffer 18 together with the intended conditional branch instruction. The instructions held in the primary instruction cache 14 include a computing instruction for executing an operation using the computing units 42 and 44, a memory access instruction, a branch instruction, or the like. In a case where the primary instruction cache 14 does not hold the instruction corresponding to the address, the primary instruction cache 14 outputs an access request to the secondary cache 16 so as to obtain the instruction from the secondary cache 16. The secondary cache 16 holds the instructions and data.

The secondary cache 16 obtains the instruction held in correspondence with the address, based on the access request, and outputs the obtained instruction to the primary instruction cache 14. When the instruction corresponding to the address is not held, the secondary cache 16 outputs an access request to the main memory 200 so as to obtain the instruction from the main memory 200. For example, the main memory 200 is included in a semiconductor chip that is separate from the semiconductor chip that includes the processing device 102.

The instruction buffer 18 holds, in parallel, a plurality of instructions output from the primary instruction cache 14, and outputs, in parallel, the plurality of held instructions to the instruction decoder 20. For example, the instruction buffer 18 outputs four instructions in parallel to the instruction decoder 20. The number of instructions output in parallel from the primary instruction cache 14 to the instruction buffer 18 is larger than four. The tag information LOOP_TAG is output to the instruction decoder 20 together with the conditional branch instruction intended for the loop process.

The instruction decoder 20 includes a plurality of decoding slots for decoding, in parallel, the plurality of instructions output from the instruction buffer 18. The number of decoding slots is not particularly limited, but is four in this example. Each decoding slot determines a reservation station 32 (321, 322, 323, and 324) corresponding to the computing units 42, the computing units 44, or the like that execute each instruction. Each decoding slot adds information or the like indicating the reservation station 32 at an issue destination of the instruction, and outputs the instruction added with the information to the selector 28 and the shared instruction decoder 22. When the instruction to be decoded includes the tag information LOOP_TAG, the instruction decoder 20 outputs the tag information LOOP_TAG together with the decoded result.

In addition, the instruction decoder 20 allocates an Instruction Identification (IID) to the instruction according to the order of descriptions within the program that is executed by the processing device 102, and outputs the allocated IID together with the decoded instruction (decoded result). The IID is used by the commit controller 34. The instruction buffer 18 and the instruction decoder 20 process the plurality of instructions (in order) in parallel without changing the order of the descriptions within the program.

When the shared instruction decoder 22 receives the instruction, including the tag information LOOP_TAG, from the instruction decoder 20, the shared instruction decoder 22 judges whether one of a plurality of entries of the instruction loop cache 26 can be shared (that is, is sharable), until the instruction including the next tag information LOOP_TAG is received. The instruction received together with the first tag information LOOP_TAG, to the instruction received together with the next tag information LOOP_TAG, are instructions intended for the loop process.

Figure 6:
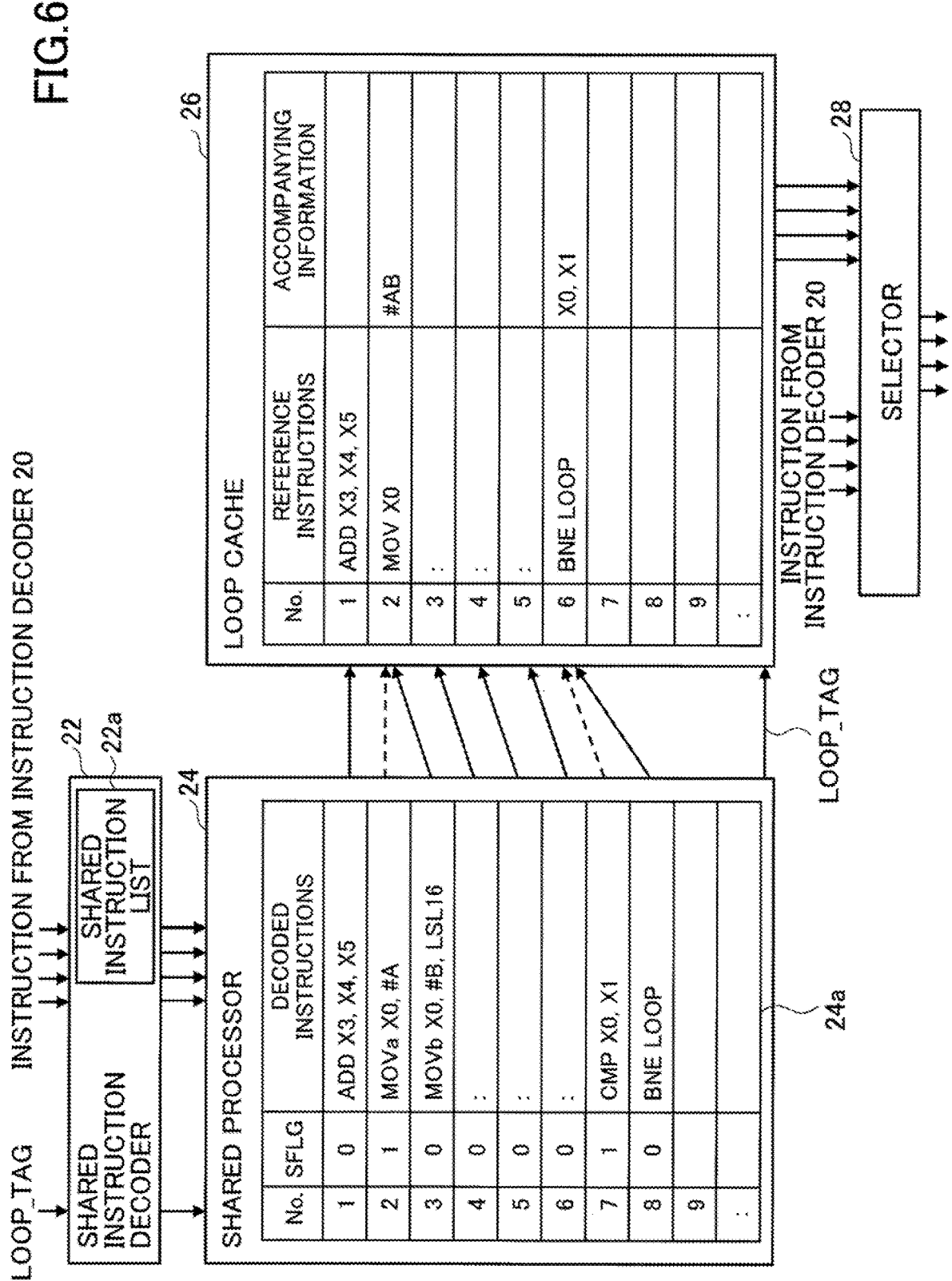
FIG. 6 is a diagram illustrating an example of information stored in a shared processor and a loop cache illustrated in FIG. 4.

For example, the shared instruction decoder 22 judges whether the plurality of consecutive target instructions intended for the loop process and decoded by the instruction decoder 20 can be treated equally as one target instruction intended for the loop process, in the loop cache 26, the register naming unit 30, and the commit controller 34. The shared instruction decoder 22 stores the target instructions intended for the loop process and received from the instruction decoder 20 in the shared processor 24, together with a shared flag SFLG indicating whether the plurality of target instructions intended for the loop process can be treated equally as one target instruction intended for the loop process. The shared flag SFLG is illustrated in FIG. 6 which will be described later. For example, the shared instruction decoder 22 stores, in parallel, the plurality of target instructions intended for the loop process in the shared processor 24. The shared flag SFLG is an example of combinable information indicating whether a target instruction intended for the loop process and another target instruction intended for the loop process can be executed as one target instruction intended for the loop process. In other words, when a target instruction intended for the loop process and another target instruction intended for the loop process are combined, the shared flag SFLG indicates whether the resources such as the computing units 42 and 44, the update buffers 46 and 48, or the like can be used without causing conflict of resources.

The shared processor 24 stores the target instruction intended for the loop process and stored in the shared instruction decoder 22 into one of the plurality of entries of the loop cache 26. In addition, when the plurality of target instructions intended for the loop process are executable as one target instruction intended for the loop process, the shared processor 24 combines the plurality of target instructions intended for the loop process into one target instruction intended for the loop process, and stores this one target instruction intended for the loop process into one of the plurality of entries of the loop cache 26. Accordingly, one entry of the loop cache 26 can be shared by a plurality of target instructions intended for the loop process, and the utilization efficiency of the entries of the loop cache 26 can be improved. The shared processor 24 may hold information indicating a relationship between the plurality of combinable target instructions intended for the loop process, and one target instruction intended for the loop process and obtained by combining the plurality of target instructions intended for the loop process, and combine a plurality of target instructions intended for the loop process and one target instruction intended for the loop process, based on the held information.

The loop cache 26 includes a plurality of entries to store instructions. The loop cache 26 successively outputs the target instructions intended for the loop process and held in the entries to the selector 28, based on completion of storage of the target instructions intended for the loop process into the entries. The instructions held in the entries of the loop cache 26 are in accordance with the order of the descriptions within the program (in order).

For example, the loop cache 26 judges that the storage of the target instructions intended for the loop process into the entries is completed, based on a notification from the shared instruction decoder 22 or the shared processor 24. For example, the shared instruction decoder 22 outputs the tag information LOOP_TAG to the loop cache 26 via the shared processor 24. In addition, the loop cache 26 judges that the storage of the target instructions intended for the loop process into the entries is completed, based on receiving the tag information LOOP_TAG two times.

When the selector 28 does not receive, from the loop cache 26, the target instruction intended for the loop process, the selector 28 selects the instruction output from the instruction decoder 20 and outputs the selected instruction to the register renaming unit 30. When the selector 28 receives, from the loop cache 26, the target instruction intended for the loop process, the selector 28 selects the target instruction intended for the process and output from the loop cache 26, and outputs the selected target instruction intended for the loop process to the register renaming unit 30.

To enable out of order execution, the register renaming unit 30, upon executing the instruction, allocates entries of the update buffer 46 (or 48) in place of the registers within the register file 50 (or 52) specified by an instruction operand. In addition, the register renaming unit 30 outputs the instructions transferred from the selector 28, together with information indicating the entries of the allocated update buffer 46 (or 37), to the register renaming unit 30 that executes the instructions. The instructions transferred from the selector 28 include information indicating the reservation station 32 to which the instructions are to be output.

For example, when the instruction decoded by the instruction decoder 20 is a memory access instruction (load instruction or store instruction), the instruction is input to the reservation station (RSA) 321. When the instruction decoded by the instruction decoder 20 is a fixed-point number operation instruction, the instruction is input to the reservation station (RSE) 322. When the instruction decoded by the instruction decoder 20 is a floating-point number operation instruction, the instruction is input to the reservation station (RSF) 323. When the instruction decoded by the decoder 20 is a branch instruction, the instruction is input to the reservation station (RSBR) 324.

The instruction decoder 20 allocates the Instruction Identification (IID) to the instruction according to the order of descriptions within the program that is executed by the processing device 102, and outputs the allocated IID together with the decoded instruction to the commit controller 34.

The reservation station 321 holds the memory access instructions successively received from the instruction decoder 20, and outputs the held memory access instructions to the operand address generators 38 in an executable order. In the following description, the reservation station 321 may also be referred to as a "Reservation Station for Address generation (RSA) 321". The reservation station 322 holds the fixed-point number operation instructions successively received from the instruction decoder 20, and outputs the held operation instructions to the computing units 42 in an executable order. In the following description, the reservation station 322 may also be referred to as a "Reservation Station for Execution (RSE) 322".

The reservation station 323 holds the floating-point number operation instructions successively received from the instruction decoder 20, and outputs the held operation instructions to the computing units 44 in an executable order. In the following description, the reservation station 323 may also be referred to as a "Reservation Station for Floating point (RSF) 323". The reservation station 324 holds the branch instructions successively received from the instruction decoder 20, until it becomes possible to judge the branch. In the following description, the reservation station 324 may also be referred to as a "Reservation Station for BRanch (RSBR) 324". The instructions held in the reservation stations 321, 322, and 323 are issued with respect to the corresponding operand address generators 38, computing units 42, and computing units 44, respectively, starting from the instruction that is ready to be executed. The instructions issued with respect to the computing units 42 and 44 are executed regardless of the order of the instructions described in the program (out of order).

The commit controller 34 includes a holding part having a queue structure for holding the instructions received via the register renaming unit 30 in the order described in the program, and a completion processor that performs the complete process. The holding part having the queue structure includes a plurality of entries. The completion processor performs the complete process with respect to the instructions in the order described in the program (in order), based on the information held in the holding part, a completion report on the instruction execution from the computing units 42 and 44, or the like.

The instruction held in the holding part of the commit controller 34 is either the instruction output from the instruction decoder 20 without passing through the loop cache 26, or the instruction from the loop cache 26. In the following description, the commit controller 34 may also be referred to as a "Commit Stack Entry (CSE) 34". The commit controller 34 is an example of a completion controller that performs the complete process with respect to the instructions in order, based on the instructions the execution of which have been completed out of order. In the following description, the complete process with respect to the instruction may be referred to as "commit".

The program counter 36 updates the memory address indicating the storage destination of the instruction, based on the instruction from the commit controller 34, and outputs the updated memory address to the instruction fetch address generator 10.

The operand address generators 38 generate the address based on the memory access instruction input from the RSA 321, and output the generated address to the primary data cache 40. The primary data cache 40 is accessed by the address from the operand address generators 38, and input and outputs data. In FIG. 3, the processing device 102 includes the plurality of operand address generators 38, however, only one operand address generator 38 may be provided in the processing device 102.

Similar to the primary instruction cache 14, when the primary data cache 40 does not hold the data corresponding to the address, the primary data cache 40 outputs an access request to the secondary cache 16 so as to obtain the data from the secondary cache 16. For example, in the case of a load instruction, the primary data cache 40 stores the obtained data in either one of the update buffers 46 and 48.

The computing unit 42 is a computing unit for fixed-point number. The processing device 102 may include a plurality of computing units 42, so as to execute, in parallel, the fixed-point number operation instructions that are decoded in parallel by the instruction decoder 20. The computing units 42 acquire the data used for the operation from the update buffer 46 or the register file 50, and store the operation result in the update buffer 46.

The computing unit 44 is a computing unit for floating-point number. For example, the processing device 102 may include a plurality of computing units 44, so as to execute, in parallel, the floating-point number operation instructions that are decoded in parallel by the instruction decoder 20. The computing units 44 acquire the data used for the operation from the update buffer 48 or the register file 52, and store the operation result in the update buffer 48. The computing units 44 include a computing unit that performs a multiply-add operation, an integer arithmetic, a logical operation, or the like.

The update buffer 46 includes a plurality of entries that hold data used for the operation performed by the computing units 42, and a managing part that manages the correspondence or association between the entries of the update buffer 46 and the registers within the register file 50. The update buffer 48 includes a plurality of entries that hold data used for the operation performed by the computing units 44, and a managing part that manages the correspondence or association between the entries of the update buffer 48 and the registers within the register file 52.

The register file 50 holds the data used for the operation performed by the computing units 42, and includes a plurality of entries that hold execution results of the operations of the computing units 42. The register file 52 holds the data used for the operation performed by the computing units 44, and includes a plurality of entries that hold execution results of the operations of the computing units 44.

For example, the processing device 102 includes the register file 50, and the register file 52. The register file 50 includes 32 fixed-point registers having a 64-bit configuration. The register file 52 includes 32 floating-point registers having a 512-bit configuration. The number of bits (or bit configuration) of each register, and the number of registers included in each of the register files 50 and 52, are not limited to those described above. In addition, the floating-point registers included in the register file 52 may have a variable bit configuration.

Circuit elements of the processing device 102 illustrated in FIG. 4 are divided into a plurality of stages by flip-flops (not illustrated), and the processing device 102 performs a pipeline process. For example, the stages (or pipeline stages) of the pipeline may include a decode stage, a decode transfer stage, a priority stage, a priority transfer stage, a buffer stage, an execution stage, and a write-back stage.

In the decode stage, the instruction is decoded by the instruction decoder 20. In the decode transfer stage, the instruction decoded by the instruction decoder 20 is issued to the RSE 322, the RSF 323, or the like. In the priority stage, the instruction issued to the computing units 42 is determined. In the priority stage, the RSE 322, for example, determines the instruction issued to the computing units 42.

In the priority transfer stage, the RSE 322, for example, issues the instruction to the computing units 42. In the buffer stage, the operands used for the operation are read from the update buffer 46, the register file 50, or the like. In the execution stage, the operation is performed by the computing units 42. In the write-back stage, the result of the operation performed by the computing units 42 is stored in the update buffer 46.

FIG. 5 is a diagram illustrating an example of a program executed by the processing device 102 illustrated in FIG. 4. In order to make the description easier to understand, FIG. 5 illustrates only the target instructions intended for the loop process. The instructions illustrated in FIG. 5 are descriptions in the so-called assembly language format. The program descriptions in FIG. 5 do not illustrates a particular instruction set architecture. Registers X0, X1, X3, X4, and X5 are included in the register file 50 or the register file 52.

"LOOP" at the first line is a label indicating a branch destination for a case where a branch condition of a conditional branch of a conditional branch instruction "Branch Not Equal (BNE)" at the eighth line is satisfied. At the first line, an add instruction ADD is executed to add the data held by the registers X4 and X5, and the store the added result in the register X3.

At the second line, a move instruction MOVa is executed to store a 16-bit immediate data #A in the register X0. At the third line, a move instruction MOVb is executed to perform a 16-bit shift to the left (upper significant side) on the data held in the register X0 (LSL 16), and thereafter store a 16-bit immediate data #B in the register X0. By the move instruction MOVb, bit values, other than the bits where the immediate data #B are stored in the register X0, are maintained.

Instructions exist at the fourth line through the sixth line, however, illustration and description thereof will be omitted. For example, an instruction which, when executed, stores the operation result or the like in the register X0 or the register X1, may be described in at least one of the fourth line through the sixth line.

At the seventh line, a compare instruction CMP is executed to compute a difference between the values held in the registers X0 and Z1, and set the condition code based on the computed difference. At the eighth line, the conditional branch instruction BNE is executed to branch to the address indicated by the label LOOP in a case where the condition code (in this example, zero flag) set by the compare instruction CMP is other than "0". For example, the value of the label LOOP is a relative value with respect to a value of the Program Counter (PC).

In a case where the instruction is an operation instruction, the instruction decoder 20 outputs information indicating the resource (reservation station 32, the computing units 42, the computing units 44, or the like) to be used to perform an out of order process. In addition, the instruction decoder 20 outputs information indicating the operation (add, subtract, multiply, divide, logical operation, or the like) to be performed. Further, the instruction decoder 20 outputs information indicating the data to be used for the operation operand, or the immediate data to be used. In the following description, the information output from the instruction decoder 20 to specify the resource or the like used by the instruction decoder 20 to execute the instruction, based on the decoded result of the instruction, may also be referred to as an instruction.

When the instruction is the operation instruction, the processing device 102 performs a register renaming. In the register renaming, the processing device 102 determines the entries of the update buffers 46 and 48, which are to be written. In addition, the processing device 102 determines the entry of the update buffer 46 from which the operand data used for the operation is to be read, or the register file 50 or 52 from which the operand data used for the operation is to be read.

Further, the processing device 102 performs the commit process of the instruction based on the completion of execution of the operation. For example, the processing device 102 writes the operation results held in the update buffers 46 and 48 into the register files 50 and 52. The processing device 102 performs an exception handling when an exception or the like that interrupts the execution of the instruction is generated.

On the other hand, when the instruction is the conditional branch instruction, the instruction decoder 20 outputs an offset value for generating the address at the branch destination, and outputs information indicating the condition to be satisfied to perform the branch. Because the conditional branch instruction does not use the register files 50 and 52, the register renaming is not performed. However, the processing device 102 includes, in addition to a processing circuit for the register renaming, a circuit that recognizes the operation instruction, which is an operation instruction for generating the branch condition of the conditional branch instruction, and is executed immediately before the conditional branch instruction, and controls a branch process. The processing device 102 operates this circuit, included in addition to the processing circuit for the register renaming, when executing the conditional branch instruction.

The processing device 102, upon satisfying the branch condition during the commit process of the instruction based on the completion of execution of the conditional branch instruction, updates the program counter 36, so that the program counter 36 indicates the address at the branch destination. In addition, the processing device 102 clears the pipeline upon occurrence of the branch misprediction.

Accordingly, between the operation instruction and the conditional branch instruction, the information output from the instruction decoder 20 differs for each of the register renaming and the instruction commit, and different circuits are operated. For this reason, depending on the types of instructions, the operation instruction and the conditional branch instruction can be executed in parallel. In addition, the plurality of operation instructions can share the computing units 42, and can be executed in parallel in a case where the registers that are used do not overlap, and the entries of the update buffer 46 do not overlap.

In the program illustrated in FIG. 5, the compare instruction CMP is executed using the computing units 42. The conditional branch instruction BNE is executed by referring to the condition code by the RSBR 324, and the resources such as the computing units 42, the update buffer 46, the register file 50, or the like are not used. Accordingly, the compare instruction CMP and the conditional branch instruction BNE do not cause conflict of resources, such as the update buffer 46 or the like, and even when stored in one entry of the loop cache 26, the commit process can be performed normally by the commit controller 34. In addition, because the move instructions MOVa and MOVb at the second line and the third line are equivalent to a move instruction of a single 32-bit immediate data, the resources that are used do not overlap even when stored in one entry of the loop cache 26, and the commit process can be performed normally.

FIG. 6 is a diagram illustrating an example of information stored in the shared processor 24 and the loop cache 26 illustrated in FIG. 4. In FIG. 6, it is assumed that the instruction decoder 20 decodes the instructions (including instructions that are not illustrated) included in the program illustrated in FIG. 5. The shared instruction decoder 22 performs a decoding operation that judges whether there exist a plurality of instructions using resources that do not overlap (that is, using non-overlapping resources), based on four decoded results (decoded instructions) output in parallel from the instruction decoder 20. The plurality of instructions using non-overlapping resources, are combinable instructions. The shared instruction decoder 22 and the shared processor 24 perform processes with respect to the plurality of instructions in parallel.

The shared processor 24 includes an instruction holding part 24*a* that holds the target instruction intended for the loop process and output from the shared instruction decoder 22. The instruction holding part 24a includes a plurality of entries including regions for storing the shared flag SFLG, and the decoded instructions. The instruction holding part 24a may be provided externally to the shared processor 24, and in this case, the instruction holding part 24a may be provided inside the shared instruction decoder 22.

The loop cache 26 includes a plurality of entries including regions for storing reference instructions and accompanying information. The regions for storing the reference instructions store instructions, which are used as references, and are parts of the decoded instructions or the plurality of instructions using non-overlapping resources. The regions for storing the accompanying information store information, such as the operands or the like, not included in the reference instructions among the plurality of instructions using non-overlapping resources. In other words, the regions for storing the accompanying information store information supplementing the reference instructions, and the plurality of instructions using non-overlapping resources are represented by the reference instructions and the accompanying information.

When the shared instruction decoder 22 receives the tag information LOOP_TAG from the instruction decoder 20, the shared instruction decoder 22 stores a next instruction, which is next to the instruction received together with the tag information LOOP_TAG, into a first entry of the instruction holding part 24a. In addition, the shared instruction decoder 22 stores the preceding instructions, which are received before the instruction received together with a next tag information LOOP_TAG, in order starting from a second entry of the instruction holding part 24a.

Further, when storing the instructions in the instruction holding part 24a, the shared instruction decoder 22 judges whether the resources used by the plurality of consecutive instructions overlap (that is, whether the instructions are combinable into one instruction). The shared instruction decoder 22 sets the shared flag SFLG of the entries of the instruction holding part 24a storing the instructions excluding the last instruction, among the plurality of instructions that are judged as using non-overlapping resources, to "1". The value of the shared flag SFLG, which indicates using the non-overlapping resources, is not limited to "1".

For example, the shared instruction decoder 22 includes a shared instruction list 22a indicating combinations of the plurality of instructions using non-overlapping resources. The shared instruction decoder 22 judges that the resources used do not overlap when the combination of instructions included in the shared instruction list 22a is received from the instruction decoder 20. The shared instruction list 22a is an example of a list part that stores information indicating the plurality of target instructions intended for the loop process and executable as one target instruction. The shared instruction decoder 22 can judge whether the resources used overlap, by comparing the information held in the shared instruction list 22a and the information of the plurality of consecutive instructions received from the instruction decoder 20.

For example, when the second move instruction MOVa and the third move instruction MOVb are combined, the shared instruction decoder 22 judges that the resources used do not overlap, and sets the shared flag SFLG of the second entry storing the move instruction MOVa to "1". In addition, when the seventh compare instruction CMP and the eighth conditional branch instruction BNE are combined, the shared instruction decoder 22 judges that the resources used do not overlap, and sets the shared flag SFLG of the seventh entry storing the compare instruction CMP to "1".

Based on receiving the tag information LOOP_TAG two times, the shared processor 24 judges that the target instructions intended for the loop process are stored in the entry of the instruction holding part 24a, and performs a process that shares the instructions held in the instruction holding part 24a. First, because the shared flag SFLG of the first entry of the instruction holding part 24a is "0", the shared processor 24 stores the add instruction ADD held in the first entry to the region for the reference instruction in the first entry of the loop cache 26. In this case, nothing is stored in the region for the accompanying information.

Next, because the shared flag SFLG of the second entry of the instruction holding part 24a is "1", the shared processor 24 refers to the information held in the third entry of the instruction holding part 24a. Because the shared flag SFLG of the third entry is "0", the shared processor 24 judges that the resources used do not overlap when the second move instruction MOVa and the third move instruction MOVb are combined. Hence, when the shared flag SFLG that is "1" is detected, the shared processor 24 judges that the instructions up to when the shared flag SFLG that is "0" is next detected, are instructions using non-overlapping resources after being combined. By providing the region for storing the shared flag SFLG that indicates whether the resources used overlap, in the instruction holding part 24a, the shared processor 24 can easily identify the instructions that can be combined into one instruction.

The shared processor 24 judges that the move instructions MOVa and MOVb using non-overlapping resources are equivalent to a move instruction MOV of a single 32-bit immediate value, and stores the move instruction MOV into the second entry of the loop cache 26. For example, the shared processor 24 stores the move instruction MOV and the operand X0 in the region for the reference instructions, and stores the 32-bit immediate data #AB in the region for the accompanying information. In other words, a process is performed to combine the two move instructions MOVa and MOVb into one instruction, and to share one of the entries of the loop cache 26 by two instructions.

Because the shared flag SFLG of the fourth through sixth entries of the instruction holding part 24a is "0", the shared processor 24 successively stores the instructions held in these entries to the third through fifth entries of the loop cache 26. Nothing is stored in the region for the accompanying information.

Next, because the shared flag SFLG of the seventh entry of the instruction holding part 24a is "1", the shared processor 24 refers to the information held in the eighth entry of the instruction holding part 24a. Because the shared flag SFLG of the eighth entry is "0", the shared processor 24 judges that the resources used do not overlap when the compare instruction CMP of the seventh entry and the conditional branch instruction BNE of the eighth entry are combined.

The shared processor 24 stores the conditional branch instruction BNE of the eight entry in the region for the reference instructions of the sixth entry of the loop cache 26, and stores the operands X0 and X1 of the compare instruction CMP of the seventh entry in the region for the accompanying information of the sixth entry of the loop cache 26. In other words, a process is performed to combine the compare instruction CMP and the conditional branch instruction BNE into one instruction, and to share one of the entries of the loop cache 26 by two instructions.

For example, the shared processor 24 need only store the instruction held in the entry having the shared flag SFLG that is "0" in the region for the reference instructions, and store the operands of the instruction held in the entry having the shared flag SFLG that is "1" in the region for the accompanying information. Hence, the shared processor 24 can perform a store process to store the instruction in the loop cache 26, without having to perform complex processes.

The target instructions intended for the loop process are stored in the entries of the loop cache 26 according to the order of descriptions within the program. In FIG. 6, the two move instructions MOVa and MOVb are stored as one instruction in the second entry of the loop cache 26, and the compare instruction CMP and the conditional branch instruction BNE are stored as one instruction in the sixth entry of the loop cache 26. Accordingly, it is possible to increase the number of instructions substantially storable in the loop cache 26, without increasing the number of entries of the loop cache 26, that is, without increasing the circuit scale.

Based on receiving the tag information LOOP_TAG two times, the loop cache 26 judges that the target instructions intended for the loop process are stored in the entries, and starts an operation to successively output the instructions held in the entries to the selector 28. While the instructions held in the entries are successively output to the selector 28, the loop cache 26 outputs to the selector 28 a direction indicating the selection of the instructions from the loop cache 26.

When the conditional branch condition of the conditional branch instruction BNE is not satisfied, and exiting from the loop process, the reference instructions and the accompanying information or the like, held in the loop cache 26, are invalidated. For this reason, when the branch predictor 12 predicts that a new loop process will continue, the target instructions intended for the new loop process are stored in the loop cache 26.

Based on the instruction from the loop cache 26, the selector 28 stops the selection of the instructions output from the instruction decoder 20, and selects the instructions output from the loop cache 26, to output the selected instruction to the register renaming unit 30. The instruction output from the loop cache 26 includes information indicating the reservation station 32 that is the transfer destination of the instruction.

Based on the instructions transferred from the selector 28, the register renaming unit 30 reserves the entries of the update buffer 46 (or 48) for each register specified by the instruction operand, for each of the instructions. In addition, the reference instruction and the accompanying information held in the second entry of the loop cache 26, for example, correspond to the move instruction MOV of the 32-bit immediate data. The RSE 322 receives the reference instruction and the accompanying information, corresponding to the move instruction MOV of the 32-bit immediate data, via the selector 28 and the register renaming unit 30.

Based on the reference instruction and the accompanying information received, the RSE 322 outputs to the computing units 42 information for executing the move instruction MOV of the 32-bit immediate data. Hence, the two move instructions MOVa and MOVb can be executed as one move instruction MOV. The information received by the RSE 322 includes information indicating the entries of the update buffer 46 to be used in correspondence with the register X0. By combining the two move instructions MOVa and MOVb into one move instruction MOV, it is possible to reduce the number of entries to be used in the update buffer 46, and increase the number of substantially usable entries of the update buffer 46. In other words, the number of usable entries of the update buffers 46 and 48 can be increased without increasing the number of entries of the update buffers 46 and 48, and without increasing the circuit scale.

The reference instruction (conditional branch instruction BNE) held in the sixth entry of the loop cache 26 is transferred to the RSBR 324 via the selector 28 and the register renaming unit 30. In addition, the accompanying information (operand of the compare instruction CMP) held in the sixth entry of the loop cache 26 is transferred to the RSE 322 via the selector 28 and the register renaming unit 30. The RSE 322 outputs control information for causing the computing units 42 to execute the compare instruction CMP (subtract with condition code setting function), based on the accompanying information transferred thereto.

The computing units 42 execute the compare instruction CMP, and set the condition code based on the execution result. The RSBR 324 refers to the condition code, judges whether the branch condition is satisfied, and updates the program counter 36 based on the judgment result. Accordingly, the compare instruction CMP and the conditional branch instruction BNE can be executed as one instruction, without causing conflict of resources within the processing device 102.

In a case where the loop cache 26 does not hold the instruction, the instruction (decoded result) output from the instruction decoder 20 is output to the register renaming unit 30 via the selector 28, without passing through the shared instruction decoder 22 and the shared processor 24. In other words, the instructions other than the instructions stored in the loop cache 26 are output to the register renaming unit 30 via the selector 28, without passing through the shared instruction decoder 22 and the shared processor 24.

For example, in a case where the first tag information LOOP_TAG is output from the branch predictor 12, the target instruction intended for the loop process is not stored in the loop cache 26. For this reason, the target instruction intended for the loop process is output to the register renaming unit 30 via the instruction decoder 20 and the selector 28, and executed, similar to the normal instruction. During execution of the instruction stored in the loop cache 26, the storage of the instruction to the shared processor 24 by the shared instruction decoder 22, and the storage of the instruction to the loop cache 26 by the shared processor 24, are respectively performed in the background. In other words, no new stages are added to the pipeline by the additional provision of the shared instruction decoder 22 and the shared processor 24, and the processing performance of the processing device 102 will not be deteriorated thereby.

After the instruction is stored in the loop cache 26, the instruction (including the accompanying information) stored in the loop cache 26 is output to the register renaming unit 30 via the selector 28, and executed. In this state, the operations of the shared instruction decoder 22 and the shared processor 24 are stopped. Accordingly, operating times of the shared instruction decoder 22 and the shared processor 24 are not included in the instruction execution time of the processing device 102, and thus, extension of the computation execution time can be reduced. As a result, compared to a case where a judgment is made to determine whether the resource is sharable, for each instruction, it is possible to improve throughput of the processing device 102.

On the other hand, in a case where a predecoder for judging whether a plurality of instructions are simultaneously executable is provided at a stage preceding the instruction decoder 20, for example, the number of stages of the pipeline increases due to the process of the predecoder, to thereby deteriorate the throughput.

Figure 7:
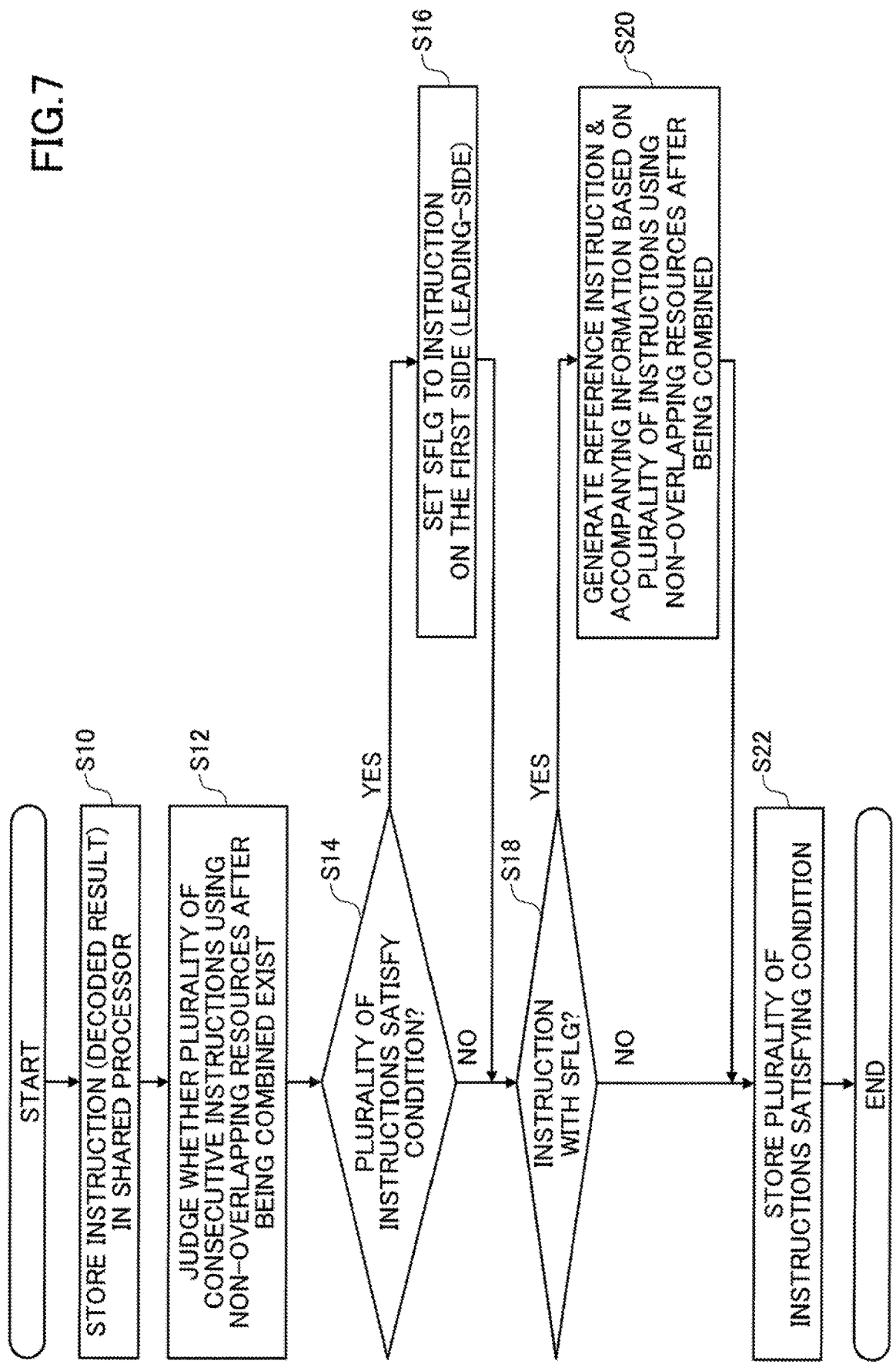
FIG. 7 is a diagram illustrating an example of operations of a shared instruction decoder and the shared processor illustrated in FIG. 4.

FIG. 7 is a diagram illustrating an example of operations of the shared instruction decoder 22 and the shared processor 24 illustrated in FIG. 4. FIG. 7 illustrates an example of a method of controlling the processing device 102. The operation illustrated in FIG. 7 is started based upon receipt of the tag information LOOP_TAG from the branch predictor 12 by the shared instruction decoder 22, via the instruction decoder 20.

First, in step S10, the shared instruction decoder 22 successively stores the instructions (decoded results) output from the instruction decoder 20 to the instruction holding part 24a of the shared processor 24, until the second tag information LOOP_TAG is received. The storage of the instructions to the instruction holding part 24a may be performed concurrently with step S16 which will be described later.

Next, in step S12, the shared instruction decoder 22 decodes the instructions (decoded results) output from the instruction decoder 20, and judges whether there exist a plurality of consecutive instructions using non-overlapping resources after being combined. Next, in step S14, the shared instruction decoder 22 moves the operation to step S16 in a case where there exist a plurality of consecutive instructions using non-overlapping resources after being combined. The shared instruction decoder 22 moves the operation to step S18 in a case where there do not exist a plurality of consecutive instructions using non-overlapping resources after being combined.

In step S16, the shared instruction decoder 22 sets the shared flag SFLG in the entries of the instruction holding part 24a storing instructions on the first side (leading-side) excluding the last instruction, among the plurality of instructions satisfying the condition that non-overlapping resources are used after being combined. Thereafter, the operation moves to step S18. The operation up to step S16 causes the entries of the instruction holding part 24a to assume a state illustrated in FIG. 6, for example.

In step S18, the shared processor 24 moves the operation to step S20 in a case where the shared flag SFLG is set in the entries of the instruction holding part 24a holding the instructions, and moves the operation to step S22 in a case where the shared flag SFLG is not set. In step S20, the shared processor 24 generates the reference instruction and the accompanying information, to combine the plurality of consecutive instructions using non-overlapping resources after being combined and store the combined instruction into one of the entries of the loop cache 26, and moves the operation to step S22.

In step S22, the shared processor 24 stores the plurality of instructions satisfying the condition, as the reference instruction and the accompanying information, into one of the entries of the loop cache 26, and stores each of the other instructions into one of the entries of the loop cache 26. The operation ends after step S22.

For example, the operations of steps S18, S20, and S22 are performed for each entry of the instruction holding part 24a illustrated in FIG. 6. Further, by repeatedly performing the operations of steps S18, S20, and S22, the entries of the loop cache 26 assume a state illustrated in FIG. 6, for example. Thereafter, the loop cache 26 successively outputs the instructions (reference instructions, or reference instructions and accompanying information) held in the entries thereof to the selector 28.

FIG. 8 is a diagram illustrating an example of an operation of the commit controller 34 illustrated in FIG. 4. In other words, FIG. 8 illustrates an example of a method of controlling the processing device 102. The operation illustrated in FIG. 8 is repeatedly performed at a predetermined period.

First, in step S30, the commit controller 34 moves the operation to step S32 in a case where the instruction is received, and moves the operation to step S38 in a case where the instruction is not received. In step S32, the commit controller 34 stores the received instruction in a queue, and moves the operation to step S34.

For example, the commit controller 34 receives the two move instructions MOVa and MOVb illustrated in FIG. 6 as one instruction (reference instruction and accompanying information), and stores the received instruction into one of the entries of the holding part thereof. In addition, the commit controller 34 receives the compare instruction CMP and the conditional branch instruction BNE as one instruction (reference instruction and accompanying information), and stores the received instruction into one of the entries of the holding part thereof. For this reason, in the case where the plurality of instructions are stored as one instruction in the loop cache 26, it is possible to increase the number of instructions substantially holdable in the queue of the commit controller 34. In other words, it is possible to increase the number of instructions substantially holdable by the commit controller 34, without increasing the capacity of the queue of the commit controller 34, and without increasing the circuit scale.

In step S34, the commit controller 34 judges that the instruction has been combined in the shared processor 24 in a case where the received instruction includes the accompanying information, and moves the operation to step S38. The commit controller 34 moves the operation to step S38 in a case where the received instruction does not include the accompanying information.

In step S36, the commit controller 34 changes an updating amount of the program counter 36 according to the number of shared instructions, during the commit process based on the completion of execution of the instruction that is obtained by combining two instructions and includes the accompanying information, and moves the operation to step S38. For example, in a case where the program counter 36 is updated to "4" upon completion of execution of one instruction, the program counter 36 is updated to "8" when the instruction including the accompanying information shares two instructions. In a case where the instruction including the accompanying information shares three instructions, the program counter 36 is updated to "12". For example, the updating amount of the program counter 36 is held in the holding part of the commit controller 34 in correspondence with an instruction identifier.

In step S38, the commit controller 34 moves the operation to step S40 in a case where an instruction complete notification is received, and ends the operation in a case where the instruction complete notification is not received. In step S40, the commit controller 34 performs the commit process that recovers the resources used to execute the instruction, based on the completion of execution of the instruction, and moves the operation to step S42. In step S42, the commit controller 34 updates the program counter 36, and ends the operation. As described above, the updating amount of the program counter 36 differs depending on whether the instructions are combined, and also differs depending on the number of instructions that are combined.

According to the second embodiment illustrated in FIG. 4 through FIG. 8, it is possible to increase the number of instructions substantially storable in the loop cache 26, without increasing the number of entries of the loop cache 26, similar to the first embodiment illustrated in FIG. 1 through FIG. 3. Hence, it is possible to improve the throughput of execution of the target instructions intended for the loop process having the high possibility of being repeatedly executed, compared to the case where the plurality of target instructions intended for the loop process are not combined. Because the operations of the shared instruction decoder 22 and the shared processor 24 are performed in the background of the execution of the target instructions intended for the loop process, the deterioration of the processing performance of the processing device 102 can be reduced.

Furthermore, in the second embodiment illustrated in FIG. 4 through FIG. 8, by combining the plurality of consecutive target instructions intended for the loop process into one target instruction intended for the loop process, it is possible to reduce the number of entries of the update buffers 46 and 48 that are used to execute the instruction, and increase the number of substantially usable entries of the update buffer 46. In addition, by combining the plurality of target instructions intended for the loop process into one target instruction intended for the loop process, it is possible to increase the number of instructions substantially holdable by the commit controller 34, without increasing the capacity of the queue of the commit controller 34, and without increasing the circuit scale.

FIG. 9 is a diagram illustrating an example of information stored in the shared processor and the loop cache of the processing device according to a third embodiment. In FIG. 9, those elements that are the same as or similar to those corresponding elements in FIG. 6 are designated by the same reference numerals, and a description thereof may be omitted. The processing device including the shared instruction decoder 22 and the shared processor 24 which perform the operation illustrated in FIG. 9, has a structure and functions similar to those of the processing device 102 illustrated in FIG. 4, except for the different functions of the shared instruction decoder 22 and the shared processor 24. In addition, an information processing system that includes the processing device having the shared instruction decoder 22 and the shared processor 24 which perform the operation illustrated in FIG. 9, has a structure and functions similar to those illustrated in FIG. 3. The shared processor 24 has a structure similar to that of the shared processor 24 illustrated in FIG. 6. The loop cache 26 has a structure and functions similar to those of the loop cache 26 illustrated in FIG. 6.

In FIG. 9, the shared instruction decoder 22 stores the move instruction MOVa, a shift instruction SFT, and the add instruction ADD that are output from the instruction decoder 20 into the entries of the instruction holding part 24a according to the order of descriptions within the program. The shift instruction SFT is an instruction to shift the data held by the register X0 by 16 bits to the left. The add instruction ADD is an instruction to add the data held by the register X0 and the 16-bit immediate data #B, and to store the added result in the register X0.

In a case where the shared instruction decoder 22 receives the tag information LOOP_TAG from the instruction decoder 20, the shared instruction decoder 22 stores a next instruction, which is next to the instruction received together with the tag information LOOP_TAG, into the first entry of the instruction holding part 24a. In addition, the shared instruction decoder 22 stores the preceding instructions, which are received before the instruction received together with a next tag information LOOP_TAG, in order starting from the second entry of the instruction holding part 24a.

In a case where the move instruction MOVa, the shift instruction SFT, and the add instruction ADD are combined, based on the shared instruction list 22a, the shared instruction decoder 22 judges that the resources used do not overlap. The shared instruction decoder 22 sets the shared flag SFLG of the entries storing the instructions MOVa and SFT, excluding the last instruction ADD, among the instructions MOVa, SFT, and ADD that are judged as using non-overlapping resources after being combined, to "1". The other information stored into each of the entries of the shared processor 24 is similar to that of FIG. 6.

Similar to FIG. 6, the shared processor 24 of FIG. 9 judges that the target instruction intended for the loop process is stored in the entry, based on receiving the tag information LOOP_TAG two times, and performs a process to share the instruction s held in the instruction holding part 24a. In the following, only operations different from those of FIG. 6 will be described.

Because the shared flag SFLG of the second entry is "1", the shared processor 24 refers to the information held in the third entry. Because the shared flag SFLG of the third entry is "1", the shared processor 24 refers to the information held in the fourth entry. Because the shared flag SFLG of the fourth entry is "0", the shared processor 24 judges that the resources that are used do not overlap when the second move instruction MOVa, the third shift instruction SFT, and the fourth add instruction ADD are combined.

In addition, the shared processor 24 judges that the move instruction MOVa, the shift instruction SFT, and the add instruction ADD are equivalent to the move instruction MOV of the 32-bit immediate data. In addition, similar to FIG. 6, the shared processor 24 stores the move instruction MOV and the operand X0 in the region for reference instruction in the second entry of the loop cache 26, and stores the 32-bit immediate value #AB in the region for the accompanying information in the second entry of the loop cache 26. In other words, the move instruction MOVa, the shift instruction SFT, and the add instruction ADD are combined into one instruction, and a process is performed to share one of the entries of the loop cache 26 by three instructions.

In the third embodiment, because three instructions are combined into one instruction, the shred processor 24 stores information corresponding to the seventh compare instruction CMP and the eighth conditional branch instruction BNE into the fifth entry of the loop cache 26. In other words, compared to the second embodiment of FIG. 6, it is possible to further improve the utilization efficiency of the loop cache 26.

The loop cache 26 judges that the target instructions intended for the loop process are stored in the entries, based on receiving the tag information LOOP_TAG two times, and starts an operation to repeatedly output the instructions held in the entries to the selector 28. While the instructions held in the entries are repeatedly output to the selector 28, the loop cache 26 outputs to the selector 28 a direction indicating the selection of the instructions from the loop cache 26.

Similar to FIG. 6, the reference instruction and the accompanying information stored in the second entry of the loop cache 26 correspond to the move instruction MOV of the 32-bit immediate data. The RSE 322 receives the reference instruction and the accompanying information, corresponding to the move instruction MOV of the 32-bit immediate data, via the selector 28 and the register renaming unit 30. Based on the received reference instruction and the accompanying information, the RSE 322 outputs information for causing the computing units 42 to execute the move instruction MOV of the 32-bit immediate data. Accordingly, the move instruction MOVa, the shift instruction SFT, and the add instruction ADD (that is, three instructions) can be executed as one move instruction MOV. The third embodiment of FIG. 9 can also obtain effects similar to those obtainable by the first and second embodiments of FIG. 1 and FIG. 8.

According to one aspect of the embodiments, it is possible to provide a processing device, and a method of controlling the processing device, which can increase the number of instructions substantially storable in a loop buffer, to improve throughput of execution of instructions by an instruction execution circuit.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing device comprising:
    an instruction decoder configured to decode instructions;
    an instruction execution circuit configured to execute the instructions decoded by the instruction decoder;
    an instruction extractor configured to extract target instructions intended for a loop process that is repeatedly performed, from the instructions decoded by the instruction decoder;
    a loop buffer including a plurality of entries configured to store the target instructions extracted by the instruction extractor;
    an instruction processor configured to store a target instruction into one of the plurality of entries of the loop buffer, and combine a plurality of consecutive target instructions into one target instruction in a case where resources of the instruction execution circuit used by the plurality of consecutive target instructions do not overlap and the plurality of consecutive target instructions are executable as one target instruction, to store the one target instruction in one of the plurality of entries of the loop buffer; and
    a selector configured to select the instruction output from the instruction decoder or the target instruction output from the loop buffer, and output the selected instruction to the instruction execution circuit.

2. The processing device as claimed in claim 1, further comprising:
    a register file including a register configured to hold information used to execute instructions;
    a buffer including a plurality of entries used in place of the register during execution of an instruction; and
    a controller configured to control allocation of the buffer, for each instruction output from the instruction decoder or for each target instruction output from the loop buffer.

3. The processing device as claimed in claim 1, further comprising:
    a complete controller, including a plurality of entries that hold an instruction output from the instruction decoder or a target instruction output from the loop buffer, and configured to perform, in order, a complete process with respect to instructions, execution of which have been completed out of order.

4. The processing device as claimed in claim 1, wherein operations of the instruction extractor and the instruction processor are performed in parallel with an operation of the instruction execution circuit on the target instructions before storage to the loop buffer.

5. The processing device as claimed in claim 1, further comprising:
    an instruction holding part configured to store combinable information indicating whether a plurality of consecutive target instructions are executable as one target instruction, together with the target instructions output from the instruction decoder,
    wherein the instruction extractor stores the extracted target instructions in the instruction holding part, and stores the combinable information in correspondence with the plurality of consecutive target instructions executable as one target instruction in the instruction holding part, and
    wherein the instruction processor combines the plurality of consecutive target instructions, based on the combinable information held in the instruction holding part, and stores the combined target instruction in the loop buffer.

6. The processing device as claimed in claim 5, further comprising:
    a list part configured to store information indicating the plurality of consecutive target instructions executable as one target instruction,
    wherein the instruction extractor refers to the list part, and determines whether to store the target instructions in the instruction holding part together with the combinable information.

7. The processing device as claimed in claim 1, wherein each entry of the loop buffer includes a first region that holds reference instructions that are parts of combined instructions of a plurality of target instructions, and a second region that holds accompanying information supplementing the reference instructions, and
    the instruction processor stores the reference instruction indicating the plurality of consecutive target instructions executable as one target instruction, and the accompanying information, in the loop buffer.

8. The processing device as claimed in claim 1, further comprising:
    an address generator configured to generate an address of an instruction to be fetched; and
    a branch predictor configured to predict the loop process, by predicting an address at a branch destination of a branch instruction based on the address generated by the address generator,
    wherein the instruction extractor extracts the target instruction intended for the loop process, based on the loop process predicted by the branch predictor.

9. The processing device as claimed in claim 1, wherein, upon extracting a compare instruction that sets a condition code according to a comparison result, and a conditional branch instruction following the compare instruction, as the target instructions by the instruction extractor, the instruction processor combines the compare instruction and the conditional branch instruction into one target instruction.

10. A method of controlling a processing device, comprising:

decoding instructions by an instruction decoder of the processing device;

executing, by an instruction execution circuit of the processing device, the instruction decoded by the decoder;

extracting, by an instruction extractor of the processing device, target instructions intended for a loop process that is repeatedly performed, from the instructions decoded by the instruction decoder;

storing, by an instruction processor of the processing device, a target instruction into one of a plurality of entries of a loop buffer of the processing device, and combine a plurality of consecutive target instructions into one target instruction in a case where resources of the instruction execution circuit used by the plurality of consecutive target instructions do not overlap and the plurality of consecutive target instructions are executable as one target instruction, to store the one target instruction in one of the plurality of entries of the loop buffer; and selecting, by a selector of the processing device, the instruction output from the instruction decoder or the target instruction output from the loop buffer, and output the selected instruction to the instruction execution circuit.

11. The method of controlling the processing device as claimed in claim 10, further comprising:

performing, in order, by a complete controller of the processing device, a complete process with respect to instructions, execution of which have been completed out of order, wherein the complete controller includes a plurality of entries that hold an instruction output from the instruction decoder or a target instruction output from the loop buffer.

12. The method of controlling the processing device as claimed in claim 10, wherein operations of the instruction extractor and the instruction processor are performed in parallel with an operation of the instruction execution circuit on the target instructions before storage to the loop buffer.

13. The method of controlling the processing device as claimed in claim 10, further comprising:

storing, by an instruction holding part of the processing device, combinable information indicating whether a plurality of consecutive target instructions are executable as one target instruction, together with the target instructions output from the instruction decoder, wherein the extracting, by the instruction extractor, stores the extracted target instructions in the instruction holding part, and the combinable information in correspondence with the plurality of consecutive target instructions executable as one target instruction in the instruction holding part, and wherein the storing, by the instruction processor, combines the plurality of consecutive target instructions, based on the combinable information held in the instruction holding part, and stores the combined target instruction in the loop buffer.

\* \* \* \* \*